| United States Patent [19] | [11] | 4,387,210 |
|---|---|---|
| Katoh et al. | [45] | Jun. 7, 1983 |

[54] PROCESS FOR PRODUCING AROMATIC POLYESTER AMIDE

[75] Inventors: Nobukatsu Katoh; Yoshio Morimoto, both of Tokai; Takashi Kataoka, Bisai; Teruo Yuasa, Nagoya, all of Japan

[73] Assignee: Mitsui Toatsu Chemical, Inc., Tokyo, Japan

[21] Appl. No.: 333,358

[22] Filed: Dec. 22, 1981

[30] Foreign Application Priority Data

Dec. 24, 1980 [JP] Japan ............................. 55-182076
Dec. 24, 1980 [JP] Japan ............................. 55-182077
Dec. 24, 1980 [JP] Japan ............................. 55-182078

[51] Int. Cl.$^3$ ............................................. C08G 69/44
[52] U.S. Cl. ................................... 528/179; 528/172; 528/180; 528/181; 528/182; 528/183; 528/184; 528/194; 528/206; 528/207; 528/208; 528/210; 528/211; 528/292
[58] Field of Search .............. 528/172, 184, 183, 179, 528/180, 181, 182, 206–208, 210, 211, 289, 194, 292

[56] References Cited

U.S. PATENT DOCUMENTS

| 3,440,218 | 4/1969 | Caldwell | 528/194 |
| 3,859,251 | 1/1975 | Kuhfuss et al. | 528/208 |
| 4,075,179 | 2/1978 | Karkoski et al. | 528/289 |

*Primary Examiner*—Lester L. Lee
*Attorney, Agent, or Firm*—Sughrue, Mion, Zinn, Macpeak and Seas

[57] ABSTRACT

An aromatic polyester amide is produced by reacting hydroxyphenyl-aminophenyl-propane with aromatic dicarboxylic acid dihalide in the presence of an inert organic solvent, and bringing the organic solvent phase containing the mixture of the reaction products of the above reaction into contact with an aqueous phase containing an acid-acceptor, whereby completing polycondensation reaction. In order to control the dissolution of water into the organic solvent phase while maintaining an adequate level of miscibility between the organic solvent phase and the aqueous phase, a neutral salt of inorganic electrolyte, such as sodium chloride, is added to the aqueous phase containing the acid-acceptor.

11 Claims, No Drawings

PROCESS FOR PRODUCING AROMATIC POLYESTER AMIDE

BACKGROUND OF THE INVENTION

The present invention relates to a process for producing an aromatic polyester amide.

Heretofore, there are known the following two processes for the production of aromatic polyester amides. According to the first known process, an aromatic polyester amide is produced by reacting an aromatic dicarboxylic acid or a derivative thereof with an aromatic dihydroxyl compound and an aromatic diamine. The process, however, is disadvantageous in that it is very difficult to establish an optimum condition for producing the copolymer with good reproducibility, because two reactions, that is, the reaction of acid halide and amino group and the reaction of acid halide and phenolic hydroxyl group, which are quite different in the reaction rate, are involved in the polymerization reaction.

The second known process involves the reaction of an aromatic dicarboxylic acid or a derivative thereof and an aromatic hydroxylamino compound for the production of an aromatic polyester amide represented by the following formula. (Japanese Patent Publication No. 46-37739 [1971])

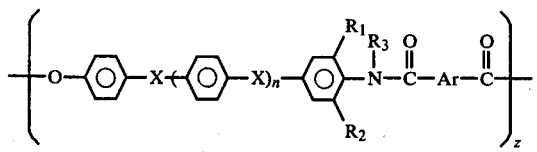

(where $R_1$ and $R_2$ denote hydrogen, alkyl group of $C_1$ to $C_3$, or chlorine or bromine atom; $R_3$ denotes hydrogen, alkyl group of $C_1$ to $C_4$, or aryl group of $C_6$ to $C_{12}$; Ar denotes p- or m-phenylene group, or diphenylene, diphenyl alkylene, diphenyl ether, or diphenyl sulfide group; X denotes a single bond, alkylene or isoalkylene group of $C_1$ to $C_5$, cycloalkylene group of $C_5$ to $C_{12}$, or oxygen or sulfur atom; n is 0 or 1; and z is an integer of 5 or over.)

The polymer obtained by this second process has preferable properties, but it also has the following drawbacks.

(1) It dissolves in chlorinated solvents such as methylene chloride, chlorobenzene, and chloroform. Therefore, it is poor in resistance to chlorinated solvents.

(2) The softening point is lower than 240° C.

(3) It is difficult to invariably obtain the polymer of high molecular weight because the growth of the polymer stops due to the hydrolysis of the active terminals of the growing polymer. This hydrolysis takes place because the polycondensation is accomplished by bringing two solutions into contact with each other—a solution of aromatic hydroxyamino compound and aromatic dicarboxylic acid dichloride dissolved in an organic solvent and an aqueous solution of acid-acceptor, and water in the aqueous solution dissolves into the organic solvent phase.

According to the known process as disclosed in the abovementioned Japanese Patent, the polymerization degree is greatly affected by the time required for charging the raw materials, because the polymerization is carried out by interfacial contact of two solutions—an organic solvent solution of hydroxyphenyl-aminophenyl-propane and aromatic dicarboxylic acid dihalide and an aqueous solution of acid-acceptor. If a polymer of high molecular weight is to be produced, the hydroxyphenyl-aminophenyl-propane and the aromatic dicarboxylic acid dihalide have to be charged exactly in equimolar amounts at the beginning of reaction. It is impossible to adjust the molecular weight by adding the raw materials during polymerization. Therefore, this process is not suitable for large-scale industrial production.

Although aromatic polyesters and aromatic polyamides have long been known, they have their merits and demerits. The former is superior in moisture absorption characteristics and wet heat resistance, but poor in thermal stability and moldability. On the other hand, the latter is superior in heat resistance but is poor in moisture absorption characteristics and moldability.

The aromatic polyester amide having both amide bonds and ester bonds is expected to be a promising polymer having the merits of both aromatic polyester and aromatic polyamide.

SUMMARY OF THE INVENTION

It is an object of the present invention to provide a process for producing a high molecular weight aromatic polyester amide having improved moldability and the outstanding characteristics of both aromatic polyesters and aromatic polyamides.

It is another object of the present invention to provide a process for producing the above-mentioned aromatic polyester amide advantageously with good reproducibility on an industrial scale.

This invention is concerned particularly with a process for producing an aromatic polyester amide polymer which comprises reacting hydroxyphenyl-aminophenyl-propane represented by the formula I:

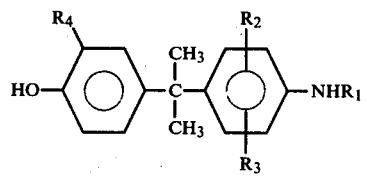

(where $R_1$ denotes a hydrogen atom or alkyl group of 1 to 3 carbon atoms; $R_2$ and $R_3$ denote a hydrogen atom, alkyl group of 1 to 3 carbon atoms, chlorine or bromine atom; and $R_4$ denotes a hydrogen atom or alkyl group of 1 to 3 carbon atoms.) with aromatic dicarboxylic acid dihalide represented by the formula II:

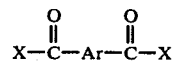

(where Ar denotes m- or p-phenylene, naphthalene, diphenylene, diphenylalkylene, diphenylether, or diphenylsulfide group; and X denotes chlorine or bromine atom) in the presence of an inert organic solvent to give the compounds represented by formulas III and IV:

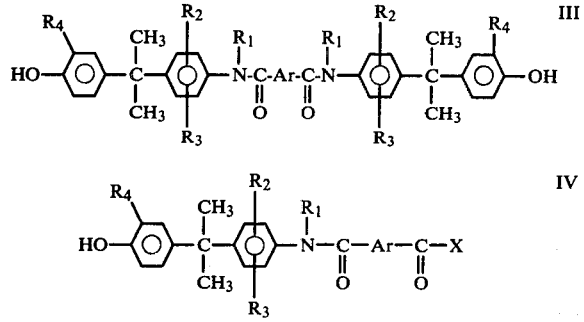

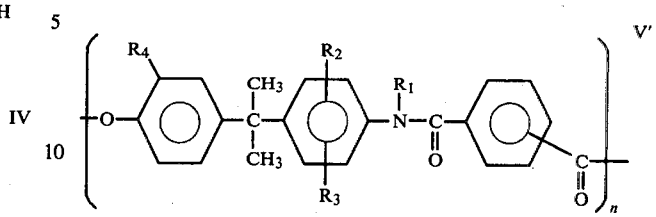

(where $R_1$, $R_2$, $R_3$, $R_4$, Ar, and X are as defined above) and subsequently bringing the organic solvent phase into contact with an aqueous phase containing an acid-acceptor, whereby completing the polycondensation reaction.

The aromatic polyester amide obtained according to the process of this invention is a linear polymer represented by the following formula V.

The aromatic polyester amide obtained by this process is a linear polymer having the repeating unit represented by the following formula V':

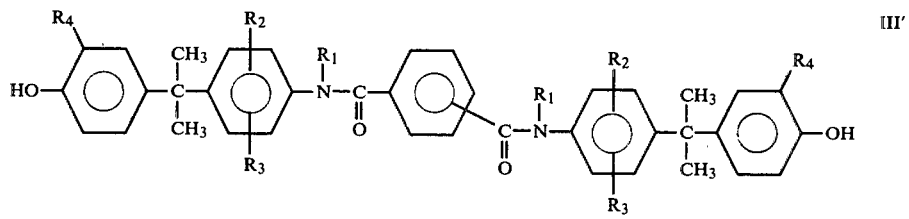

(where $R_1$, $R_2$, $R_3$, and $R_4$ are as defined above; and n is an integer of 15 or over.)

According to another embodiment of the present invention, an aromatic polyester amide is produced by bringing an inert organic solvent phase containing at least one kind of phthalamide derivative represented by the formula III':

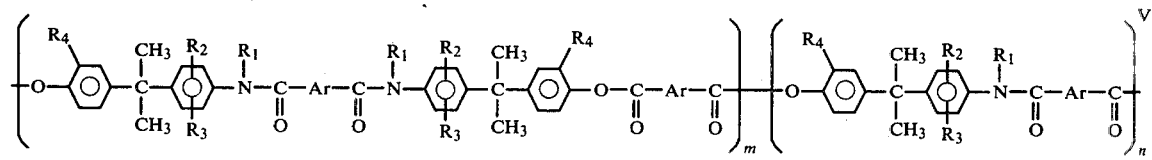

(where $R_1$, $R_2$, $R_3$, and $R_4$ are as defined above) and at least one kind of aromatic dicarboxylic acid dihalide represented by the formula II:

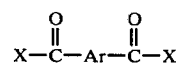

(where X and Ar are as defined above) and, if necessary, at least one kind of aromatic benzoyl halide represented by the formula IV':

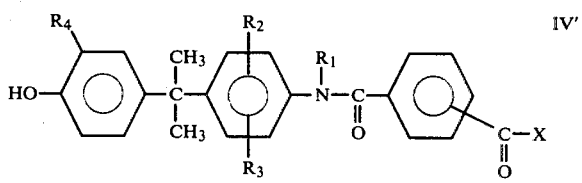

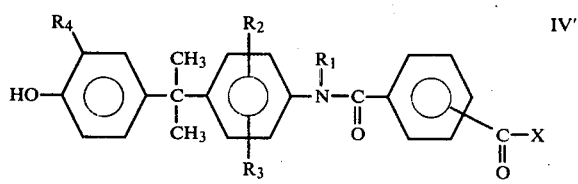

(where $R_1$, $R_2$, $R_3$, $R_4$, and Ar are as defined above; m and n are an integer of 1 or over; and $2m+n \geq 15$.)

According to one embodiment of the present invention, an aromatic polyester amide is produced by ringing an organic solvent phase of at least one kind of benzoyl halide represented by the formula IV':

(where $R_1$, $R_2$, $R_3$, $R_4$, and X are as defined above) dissolved in an inert organic solvent into contact with an aqueous phase containing an acid-acceptor, whereby carrying out polycondensation.

(where $R_1$, $R_2$, $R_3$, $R_4$, and X are as defined above) into contact with an aqueous phase containing an acid-acceptor, whereby carrying out polycondensation.

The resulting polymer obtained according to this process has the following formula V'':

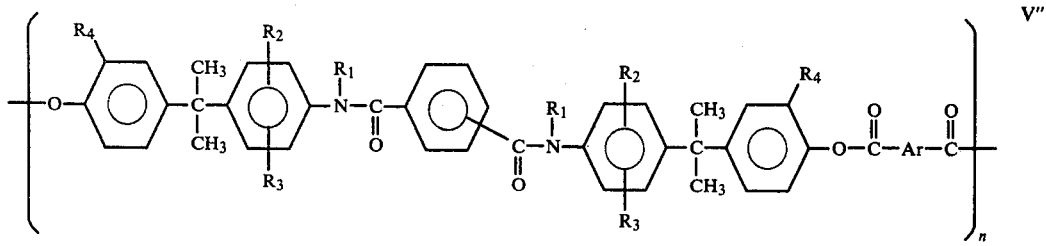

(where $R_1$, $R_2$, $R_3$, $R_4$, and Ar are as defined above; and n is an integer of 5 or over).

DETAILED DESCRIPTION OF THE INVENTION

The hydroxyphenyl-aminophenyl-propane represented by formula I includes, for instance, the following known substances.

2,2-bis[4-hydroxy-4'-aminodiphenyl]-propane,
2,2-bis[4-hydroxy-4'-methylaminodiphenyl]-propane,
2,2-bis[4-hydroxy-4'-ethylaminodiphenyl]-propane,
2,2-bis[4-hydroxy-4'-propylaminodiphenyl]-propane,
2,2-bis[4-hydroxy-2',5'-dimethyl-4'-aminodiphenyl]-propane,
2,2-bis[4-hydroxy-2'-chloro-4'-aminodiphenyl]-propane, and
2,2-bis[4-hydroxy-3-methyl-4'-aminodiphenyl]-propane.

Examples of the aromatic dicarboxylic acid dihalide represented by formula II include dichloride or dibromide of terephthalic acid, isophthalic acid, naphthalenedicarboxylic acid, diphenylenedicarboxylic acid, diphenyletherdicarboxylic acid, and diphenylsulfidedicarboxylic acid. They are used individually or in combination.

The organic solvent used in this invention should preferably be one which does not react substantially with hydroxyphenyl-aminophenyl-propanes and aromatic dicarboxylic acid dihalides and dissolves the resulting polymer, but is not a good solvent.

The organic solvent should preferably be as free from reactive impurities as possible (less than 1%). Examples of the organic solvents include organic polar solvents such as ether, ketone, and nitro compounds. The organic solvents may be used individually or in combination, or incorporated with a diluent. Typical examples of the organic solvents include cyclic ethers such as tetrahydrofuran and dioxane; ketones such as cyclohexanone, acetophenone, and isophorone; and aromatic nitro compounds such as nitrobenzene. Suitable examples of the diluents include benzene, chlorobenzene, toluene, xylene, methylene chloride, and chloroform.

The hydroxyphenyl-aminophenyl-propane and aromatic dicarboxylic acid dihalide are reacted in an inert solvent in the following manner.

The hydroxyphenyl-aminophenyl-propane and aromatic dicarboxylic acid dihalide can be added in any manner, that is, solid or a solvent solution of aromatic dicarboxylic acid may be added to a solvent solution of hydroxyphenylaminophenyl-propane. Or, conversely, solid or a solvent solution of hydroxyphenyl-aminophenyl-propane may be added to a solvent solution of aromatic dicarboxylic acid dihalide. The reaction takes place immediately and comes to an end within 10 minutes under normal conditions at a reaction temperature of 5° to 80° C., preferably 20° to 40° C.

The hydroxyphenyl-aminophenyl-propane and aromatic dicarboxylic acid dihalide are used preferably in equimolar amounts, but deviation from the equimolar amounts may be allowed to control the terminal groups and polymerization degree. Even when any unbalance occurs in the stoichiometric quantities of the reactants, it is also possible to make additional charge to correct such an unbalance. The reaction times is 5 to 20 minutes, preferably 8 to 10 minutes.

When the hydroxyphenyl-aminophenyl-propane and aromatic dicarboxylic acid dihalide are reacted in approximately equimolar quantities, the reaction products are obtained, for instance, at the following ratios (expressed by the ratio of areas in liquid chromatography).

Compound (Formula III): Compound (Formula IV): Unreacted aromatic dicarboxylic acid dihalide=32.8%:63.6%:3.5% In other words, the reaction stops when the compound (Formula III) and the compound (Formula IV) are formed at a ratio of approximately 1:2.

The organic solvent solution containing the reaction products of hydroxyphenyl-aminophenyl-propane and aromatic dicarboxylic acid dihalide is then brought into contact with an aqueous phase containing an acid-acceptor, and thereby the polycondensation is completed. In this step, the aqueous phase containing an acid-acceptor may be added to the organic solvent phase, or conversely the organic solvent phase may be added to the aqueous phase. Usually, the latter method is suitable.

Examples of the acid-acceptor include hydroxides of alkali metals such as lithium hydroxide, sodium hydroxide, and potassium hydroxide; carbonates or bicarbonates of alkali metals such as sodium carbonate, potassium carbonate, sodium bicarbonate, and potassium bicarbonate; sodium acetate, potassium acetate, disodium phthalate, and dipotassium phthalate, and hydroxides and carbonates of alkaline earth metals. The acid-acceptor is used in an amount sufficient to neutralize hydrogen chloride that is generated by polycondensation reaction.

What is important in producing the aromatic polyester amide according to the present invention is the miscibility of the aqueous phase containing an acid-acceptor and the organic solvent phase containing the reaction products of formula I and formula II. If the miscibility between the two phases is high, water dissolves more into the organic solvent phase, causing the carbonyl halide group, which is the active terminal of the growing polymer, to be hydrolyzed. This makes it difficult to obtain a polymer of high molecular weight. In addition, the polymer obtained under such a condition tends to be poor in thermal stability because of the increased content of carboxyl groups. On the other hand, if the miscibility is low, the polycondensation reaction does not proceed at a sufficient speed between the aromatic phthalamide derivative of formula III and the aromatic benzoyl halide of formula IV. Thus, it is impossible to obtain a polymer of high molecular weight. In order to keep the miscibility at a proper level and to control the dissolution of water into the organic solvent phase, an electrolyte of inorganic neutral salt having the following characteristics is added to the aqueous phase containing an acid-acceptor.
(1) High water solubility.
(2) Not reactive with acid-acceptors, hydroxyphenylaminophenyl-propanes, and aromatic dicarboxylic acids.
(3) Not reactive with aromatic phthalamide of formula III and aromatic benzoyl halide of formula IV.
(4) Not reactive with organic solvents.
(5) Not reactive with aromatic polyester amide.

Examples of such an electrolyte of inorganic salt include lithium chloride, sodium chloride, potassium chloride, calcium chloride, ammonium chloride, potassium nitrate, ammonium sulfate, sodium bromide, and potassium bromide. The inorganic electrolyte is used in an amount from 15 to 25 wt% in the aqueous phase, depending on the reaction conditions.

In order to obtain an aromatic polyester amide of high molecular weight according to the process of this invention, it is essential that the contact of the organic solvent phase and the aqueous phase should be carried out as quickly as possible. Otherwise, polymers having a high polymerization degree cannot be obtained.

The polycondensation reaction time is usually 2 to 4 hours, depending on the reaction conditions such as reaction temperature and kinds of organic solvent and acid-acceptor used. The reaction temperature is usually −10° to 40° C., preferably 5° to 20° C.

The organic solvent is used in such an amount that the concentration of the aromatic polyester amide resulting from polycondensation reaction is 5 to 25 wt%, preferably 10 to 20 wt% in the organic solvent. Under 5 wt%, productivity is too low to justify the process economically; over 25 wt%, polymers of high molecular weight cannot be obtained.

The organic solvent and water should be used in a ratio of 100 parts by weight of organic solvent to 25 to 100 parts by weight, preferably 30 to 80 parts by weight, of water.

The resulting polymer is separated from the aqueous phase and then purified as follows: After separation of the organic solvent phase from the aqueous phase, the former is introduced into a medium such as water, methanol, acetone, benzene, and toluene, which does not practically dissolve the polymer, causing the polymer to separate out. The polymer is finally removed and dried.

The benzoyl halide derivative of formula IV′ used in this invention is a novel compound as described in Japanese Patent Application No. 55-155962 (1980) filed on Nov. 7, 1980. According to this patent application, the benzoyl halide derivative is produced by reacting hydroxyphenylaminophenyl-propane of formula I with aromatic dicarboxylic acid dihalide of formula II, in a ratio of one mole of the former to more than two moles of the latter, in an inert organic solvent such as cyclohexanone and tetrahydrofuran, at −10° C. to 40° C. for 5 to 10 minutes, followed by separation and recrystallization in the usual manner.

The typical examples of benzoyl halide derivatives include:

p-[N-[4-[2-(4-hydroxyphenyl)-2-propyl]phenyl]amide]benzoyl chloride,
p-[N-methyl-N-[4-[2-(4-hydroxyphenyl)-2-propyl]phenyl]amide]benzoyl chloride,
p-[N-ethyl-N-[4-[2-(4-hydroxyphenyl)-2-propyl]phenyl]amide]benzoyl chloride,
p-[N-propyl-N-[4-[2-(4-hydroxyphenyl)-2-propyl]phenyl]amide]benzoyl chloride,
p-[N-[4-[2-(4-hydroxyphenyl)-2-propyl]-2-methylphenyl]amide]benzoyl chloride,
p-[N-[4-[2-(4-hydroxyphenyl)-2-propyl]-2,5-dimethyl-phenyl]amide]benzoyl chloride,
p-[N-[4-[2-(4-hydroxyphenyl)-2-propyl]-2-chlorophenyl]amide]benzoyl chloride,
p-[N-[4-[2-(4-hydroxy-3-methyl-phenyl)-2-propyl]phenyl]amide]benzoyl chloride,
m-[N-[4-[2-(4-hydroxyphenyl)-2-propyl]phenyl]amide]benzoyl chloride,
m-[N-methyl-N-[4-[2-(4-hydroxyphenyl)-2-propyl]phenyl]amide]benzoyl chloride,
m-[N-ethyl-N-[4-[2-(4-hydroxyphenyl)-2-propyl]phenyl]amide]benzoyl chloride,
m-[N-propyl-N-[4-[2-(4-hydroxyphenyl)-2-propyl]phenyl]amide]benzoyl chloride,
m-[N-[4-[2-(4-hydroxyphenyl)-2-propyl]-2-methylphenyl]amide]benzoyl chloride,
m-[N-[4-[2-(4-hydroxyphenyl)-2-propyl]-2,5-dimethyl-phenyl]amide]benzoyl chloride,
m-[N-[4-[2-(4-hydroxyphenyl)-2-propyl]-2-chlorophenyl]amide]benzoyl chloride, and
m-[N-[4-[2-(4-hydroxy-3-methyl-phenyl)-2-propyl]phenyl]amide]benzoyl chloride.

An aromatic polyester amide is produced by polycondensation reaction from the benzoyl halide of formula IV′ using the above-mentioned organic solvent, reaction conditions, acid-acceptor, and inorganic electrolyte.

The phthalamide derivative of formula III′ which is used in the polycondensation reaction starting from the compound of formula III′ and the compounds of formula II, and, if necessary, the compound of formula IV′, is a novel compound as described in Japanese Patent Application No. 55-155963 (1980) filed on Nov. 7, 1980. According to this patent application, the phthalamide derivative is produced by reacting hydroxyphenylaminophenyl-propane and aromatic dicarboxylic acid dihalide at a molar ratio of 2:1 at −10° to 40° C. in the presence of an inert organic solvent. The reaction product can be used as such for the polymerization reaction in the process of this invention, or may be used after purification in the usual manner.

Typical examples of such phthalamide include:
N,N′-diethyl-N,N′-bis[4-[2-(4-hydroxyphenyl)-2-propyl]phenyl]terephthalamide,
N,N′-dipropyl-N,N′-bis[4-[2-(4-hydroxyphenyl)-2-propyl]phenyl]terephthalamide,
N,N′-bis[4-[2-(4-hydroxyphenyl)-2-propyl]-2-methylphenyl]terephthalamide,
N,N′-bis[4-[2-(4-hydroxyphenyl)-2-propyl]-2,5-dimethylphenyl]terephthalamide,
N,N′-bis[4-[2-(4-hydroxyphenyl)-2-propyl]-2-chlorophenyl]terephthalamide,
N,N′-bis[4-[2-(4-hydroxy-3-methyl-phenyl)-2-propyl]phenyl]terephthalamide,
N,N′-bis[4-[2-(4-hydroxyphenyl)-2-propyl]phenyl]terephthalamide,
N,N′-bis[4-[2-(4-hydroxyphenyl)-2-propyl]phenyl]isophthalamide, N,N'-diethyl-N,N'-bis[4-[2-(4-hydroxyphenyl)-2-propyl]phenyl]isophthalamide,
N,N'-dipropyl-N,N'-bis[4-[2-(4-hydroxyphenyl)-2-propyl]phenyl]isophthalamide,
N,N'-bis[4-[2-(4-hydroxyphenyl)-2-propyl]-2-methylphenyl]isophthalamide,
N,N'-bis[4-[2-(4-hydroxyphenyl)-2-propyl]-2,5-dimethylphenyl]isophthalamide,
N,N'-bis[4-[2-(4-hydroxyphenyl)-2-propyl]-2-chlorophenyl]isophthalamide, and
N,N'-bis[4-[2-(4-hydroxy-3-methyl-phenyl)-2-propyl]phenyl]isophthalamide.

These phthalamide derivatives may be used individually or in combination.

In the production of aromatic polyester amide from the phthalamide of formula III' and the aromatic dicarboxylic acid dihalide of formula II, and, if necessary, the benzoyl chloride of formula IV', the same organic solvent and acid-acceptor as mentioned above can be used. Also, the polycondensation reaction can be accomplished by bringing the organic solvent solution containing starting materials and the aqueous phase containing an acid-acceptor into with each other in the same manner and under the same conditions as mentioned above. In addition, the above-mentioned inorganic electrolyte may be used to the aqueous phase.

In the polycondensation reaction for the compounds of formula III' and formula II, the phthalamide and the aromatic dicarboxylic acid dihalide are used in equimolar amounts, but deviation from the equimolar amounts is permitted to control the terminal groups and polymerization degree.

In the polymerization reaction for the three compounds of formula III', formula II, and formula IV', the last component (aromatic benzoyl halide) is used so that the phthalamide derivative and the aromatic dicarboxylic acid dihalide are in the equimolar amounts, because it contains one each of —OH group and carbonyl halide group in one molecule. Deviation from the equimolar amounts is permitted to control the terminal groups and polymerization degree.

The aromatic benzoyl halide and the aromatic dicarboxylic acid dihalide can be used in any ratio. The organic solvent and water should be used in ratios of 100 parts by weight of the former to 25 to 100 parts by weight, preferably 30 to 80 parts by weight, of the latter.

The resulting polymer is separated from the aqueous phase and then purified as follows: After separation of the organic solvent phase from the aqueous phase, the former is introduced into a medium such as water, methanol, acetone, benzene, and toluene, which does not practically dissolve the polymer, causing the polymer to separate out. The polymer is finally removed and dried.

According to the process of this invention, it is possible to obtain a polymer of high molecular weight having a reduced viscosity $\eta$red (30° C.) greater than 0.8 as measured for a solution containing 0.5 g of the polymer in 100 ml of N-methylpyrrolidone.

The aromatic polyester amide obtained according to the process of this invention has a higher molecular weight than that of known aromatic polyester amides. It is improved in mechanical properties such as tensile strength, flexural strength, and impact strength and is insoluble in halogenated hydrocarbon solvents such as chloroform, methylene chloride, chlorobenzene, and methylene chloride. In addition, it is outstanding in heat resistance, with the softening point being 270° to 320° C. and the thermal decomposition temperature being higher than 400° C.

The aromatic polyester amide obtained according to the process of this invention is soluble in such solvents as cyclohexanone, acetophenone, isophorone, N,N'-dimethylacetamide, N-methylpyrrolidone, tetrahydrofuran, dioxane, and nitrobenzene. Because of this solubility, the aromatic polyester amide can be formed into a film by casting or formed into heat resistant films, fibers, or moldings by injection molding, extrusion molding, and the like in the form of solution or melt. Such products can be used as insulation materials, laminates, varnish, and other industrial materials in broad application areas because of the outstanding properties.

The aromatic polyester amide obtained according to the process of this invention may be incorporated with additives such as filler and reinforcement or may be blended with other polymers.

The invention is illustrated by the following non-limitative examples.

EXAMPLE 1

Into a 200-ml three-necked flask equipped with a stirrer, thermometer, and condenser were charged 1.30 g of sodium hydroxide, 21.6 g of sodium chloride, and 81.0 ml of water. The contents of the flask were cooled and kept at 5° to 10° C.

On the other hand, phthalamide and benzoyl chloride were prepared by reacting 7.41 g of 2,2-bis(4-hydroxy-4'-aminodiphenyl)-propane and 6.62 g of isophthalic acid dichloride dissolved in 90.0 g of cyclohexanone at 5° to 10° C. for 10 minutes. According to the nuclear magnetic resonance spectrum, infra red absorption spectrum, and liquid chromatography, the reaction products were N,N'-bis[4-[2-(4-hydroxyphenyl)-2-propyle]phenyl]isophthalamide represented by the formula:

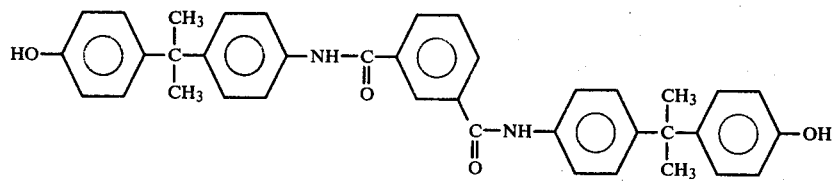

and m-[N-[4-[2-(4-hydroxyphenyl)-2-propyl]phenyl]amide]benzoyl chloride represented by the formula

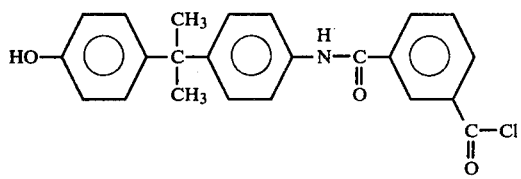

The cyclohxanone solution was added all at once with vigorous stirring to the flask containing sodium hydroxide, sodium chloride, and water. Reaction was carried out with vigorous stirring at 5° to 10° C. for about 4 hours. After completion of reaction, the flask was allowed to stand until the organic phase and aqueous phase separated from each other. The organic phase was washed five times with 500 ml of water to remove inorganic salts. The organic phase was poured into about 1 liter of warm water to cause the polymer to separate out, and the separated polymer was vacuum dried at 150° C. for 5 hours.

A polymer having the following characteristics was obtained in an amount of 10.8 g (yield: 92%).

Reduced viscosity: 0.80
Thermal decomposition temperature: 415° C.
Weight-average molecular weight: 15,000

EXAMPLE 2

Into a 200-ml three-necked flask equipped with a stirrer, thermometer, and condenser were charged 1.31 g of sodium hydroxide, 22.0 g of sodium chloride, and 80.0 ml of water. The contents of the flask were cooled and kept at 5° to 10° C.

On the other hand, phthalamide and benzoyl chloride were prepared by reacting 7.40 g of 2,2-bis(4-hydroxy-4'-aminodiphenyl)-propane and 6.61 g of terephthalic acid dichloride dissolved in 90.0 g of tetrahydrofuran at 5° to 10° C. for 10 minutes. According to the nuclear magnetic resonance spectrum, infra red absorption spectrum, and liquid chromatography, the reaction products were N,N'-bis[4-[2-(4-hydroxyphenyl)-2-propyle]phenyl]terephthalamide represented by the formula:

Thermal decomposition temperature: 425° C.
Weight-average molecular weight: 17,000

Example of synthesis of benzoyl chloride

Into a 100-ml four-necked flask equipped with a stirrer, thermometer, and calcium chloride tube were charged, after complete replacement with nitrogen, 26.0 g of 2,2-(4-hydroxy-4'-aminodiphenyl)propane, 23.0 g of isophthalic acid dichloride, and 113 ml of tetrahydrofuran. Reaction was carried out at 20° to 25° C. for 2 minutes. The reaction product was subjected to column chromatography (using Wako Gel made by Wako Junyaku Co.) to obtain 15.75 g of m-[N-[4-[2-(4-hydroxyphenyl)-2-propyl]phenyl]amide]benzoyl chloride. In the similar manner, it was possible to obtain p-[N-[4-[2-(4-hydroxyphenyl)-2-propyl]phenyl]amide]benzoyl chloride from 2,2-(4-hydroxy-4'-aminodiphenyl)propane and terephthalic acid dichloride.

EXAMPLE 3

Into a 200-ml three-necked flask equipped with a stirrer, thermometer, and condenser were charged 1.60 g of sodium hydroxide, 21.6 g of sodium chloride, and 81 ml of water. The contents of the flask were cooled and kept at 5° to 10° C.

On the other hand, 15.75 g of m-[N-[4-[2-(4-hydroxyphenyl)-2-propyl]phenyl]amide]benzoyl chloride synthesized above was dissolved in 92.0 g of cyclohexanone.

The cyclohexanone solution was added all at once with vigorous stirring to the flask containing sodium hydroxide, sodium chloride, and water. Reaction was carried out with vigorous stirring at 5° to 10° C. for about 4 hours. After completion of reaction, the flask was allowed to stand until the organic phase and aqueous phase separated from each other. The organic phase was washed five times with 400 ml of water to remove inorganic salts. The organic phase was poured into about 1 liter of warm water to cause the polymer to separate out, and the separated polymer was vacuum dried at 150° C. for 5 hours.

A white polymer having the following characteristics was obtained in an amount of 13.1 g (yield: 91%).

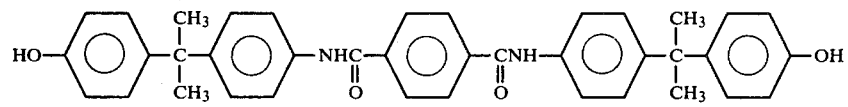

and p-[N-[4-[2-(4-hydroxyphenyl)-2-propyl]phenyl]amide]benzoyl chloride represented by the formula:

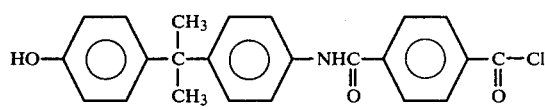

The tetrahydrofuran solution was added all at once with vigorous stirring to the flask containing sodium hydroxide, sodium chloride, and water. Reaction was carried out with vigorous stirring at 5° to 10° C. for about 4 hours. After completion of reaction, the resulting polymer was separated and treated as in Example 1.

A polymer having the following characteristics was obtained in an amount of 10.0 g (yield: 91%).

Reduced viscosity: 1.10

Reduced viscosity: 0.80
Thermal decomposition temperature: 415° C.
Weight-average molecular weight: 15,000

EXAMPLE 4

Into the same apparatus as used in Example 3 were charged 1.60 g of sodium hydroxide, 21.0 g of sodium chloride, and 75.0 ml of water. The contents of the flask were cooled and kept at 5° to 10° C.

On the other hand, 15.75 g of p-[N-[4-[2-(4-hydroxyphenyl)-2-propyl]phenyl]amide]benzoyl chloride synthesized above was dissolved in 92.0 g of cyclohexanone.

The cyclohexanone solution was added all at once with vigorous stirring to the flask containing sodium hydroxide, sodium chloride, and water. Reaction was carried out with vigorous stirring at 5° to 10° C. for about 4 hours. After completion of reaction, the resulting polymer was treated as in Example 3.

A white polymer having the following characteristics was obtained in an amount of 13.4 g (yield: 94%).
Reduced viscosity: 1.23
Thermal decomposition temperature: 431° C.
Weight-average molecular weight: 18,500

EXAMPLE 5

Into the same apparatus as used in Example 3 were charged 1.60 g of sodium hydroxide, 18.9 g of sodium chloride, and 80 ml of water. The contents of the flask were cooled and kept at 5° to 10° C.

On the other hand, 10.0 g of p-[N-[4-[2-(4-hydroxyphenyl)-2-propyl]phenyl]amide]benzoyl chloride and 5.75 g of m-[N-[4-[2-(4-hydroxyphenyl)-2-propyl]phenyl]amide]benzoyl chloride were dissolved in 90.0 g of cyclohexanone.

The cyclohexanone solution was added all at once with vigorous stirring to the flask containing sodium hydroxide, sodium chloride, and water. Reaction was carried out with vigorous stirring at 5° to 10° C. for about 3 hours and 50 minutes. After completion of reaction, the flask was allowed to stand until the organic phase and aqueous phase separated from each other. The organic phase was washed five times with 400 ml of water. After the same treatment as in Example 3, a white polymer having the following characteristics was obtained in an amount of 12.8 g (yield: 90%).
Reduced viscosity: 0.90
Thermal decomposition temperature: 421° C.
Weight-average molecular weight: 15,000

EXAMPLES OF SYNTHESES OF PHTHALAMIDE DERIVATIVES

N,N'-bis[4-[2-(4-hydroxyphenyl)-2-propyl]phenyl]isophthalamide

Into a 100-ml four-necked flask equipped with a stirrer, thermometer, and calcium chloride tube were charged, after complete replacement with nitrogen, 7.5 g of 2,2-bis-(4-hydroxy-4'-aminodiphenyl)propane, 3.35 g of isophthalic acid dichloride, and 33 ml of tetrahydrofuran. Reaction was carried out at 20° to 23° C. for 30 minutes. After the completion of reaction, 3.34 g of triethylamiene was added to neutralize hydrogen chloride formed as by-product. After removal of triethylamine hydrochloride, filtration, and condensation, 11.69 g of white crystals was obtained.

N,N'-bis[4-[2(4-hydroxyphenyl)-2-propyl]phenyl]terephthalamide

Synthesis was carried out in the same manner as above except that isophthalic acid dichloride was replaced by terephthalic acid dichloride.

p-[N-[4-[2-(4-hydroxyphenyl)-2-propyl]phenyl]amide]benzoyl chloride

Into a 100-ml four-necked flask equipped with a stirrer, thermometer, and calcium chloride tube were charged, after complete replacement with nitrogen, 9.49 g of 2,2-(4-hydroxy-4'-aminodiphenyl)propane, 8.40 g of terephthalic acid dichloride, and 41.25 ml of tetrahydrofuran. Reaction was carried out at 20° to 25° C. for 2 minutes. The reaction product was subjected to column chromatography (using Wako Gel made by Wako Junyaku Co.) to obtain 5.75 g of p-[N-[4-[2-(4-hydroxyphenyl)-2-propyl]phenyl]amide]benzoyl chloride.

EXAMPLE 6

Into a 200-ml three-necked flask equipped with a stirrer, thermometer, and condenser were charged 1.60 g of sodium hydroxide, 21.6 g of sodium chloride, and 80.8 ml of water. The contents of the flask were cooled and kept at 5° to 10° C.

On the other hand, 11.69 g of N,N'-bis-[4-[2-(4-hydroxyphenyl)-2-propyl]phenyl]iosphthalamide synthesized above and 4.06 g of isophthalic acid dichloride were dissolved in 91.53 g of cyclohexanone.

The cyclohexanone solution was added all at once with vigorous stirring to the flask containing sodium hydroxide, sodium chloride, and water. Reaction was carried out with vigorous stirring at 5° to 10° C. for about 4 hours. After completion of reaction, the flask was allowed to stand until the organic phase and aqueous phase separated from each other. The organic phase was washed five times with 400 ml of water to remove inorganic salts. The organic phase was poured into about 1 liter of warm water to cause the polymer to separate out, and the separated polymer was vacuum dried at 150° C. for 5 hours.

A white polymer having the following characteristics was obtained in an amount of 13.5 g (yield: 94%).
Reduced viscosity: 0.84
Thermal decomposition temperature: 420° C.
Weight-average molecular weight: 18,000

EXAMPLE 7

Into the same apparatus as used in Example 6 were charged 1.60 g of sodium hydroxide, 21.0 g of sodium chloride, and 73.8 ml of water. The contents of the flask were cooled and kept at 5° to 10° C.

On the other hand, 11.65 g of N,N'-bis[4-[2-(4-hydroxyphenyl)-2-propyl]phenyl]terephthalamide synthesized above and 4.05 g of terephthalic acid dichloride were dissolved in 90.0 g of cyclohexanone.

The cyclohexanone solution was added all at once with vigorous stirring to the flask containing sodium hydroxide, sodium chloride, and water. Reaction was carried out with vigorous stirring at 5° to 10° C. for about 3.5 hours. After completion of reaction, the resulting polymer was treated as in Example 6.

A white polymer having the following characteristics was obtained in an amount of 13.2 g (yield: 92%).
Reduced viscosity: 1.24
Thermal decomposition temperature: 430° C.
Weight-average molecular weight: 19,000

EXAMPLE 8

Into the same apparatus as used in Example 6 were charged 1.60 g of sodium hydroxide, 18.9 g of sodium chloride, and 80 ml of water. The contents of the flask were cooled and kept at 5° to 10° C.

On the other hand, 11.66 g of N,N'-bis[4-[2-(4-hydroxyphenyl)-2-propyl]phenyl]isophthalamide synthesized above and 4.06 of terephthalic acid dichloride were dissolved in 90.0 g of cyclohexanone.

The cyclohexanone solution was added all at once with vigorous stirring to the flask containing sodium hydroxide, sodium chloride, and water. Reaction was carried out with vigorous stirring at 5° to 10° C. for about 4.5 hours. After completion of reaction, the resulting polymer was treated as in Example 6.

A white polymer having the following characteristics was obtained in an amount of 13.0 g (yield: 91%).
Reduced viscosity: 0.91
Thermal decomposition temperature: 420° C.
Weight-average molecular weight: 15,000

EXAMPLE 9

Into a 200-ml three-necked flask equipped with a stirrer, thermometer, and condenser were charged 1.95 g of sodium hydroxide, 29.5 g of sodium chloride, and 110.0 ml of water. The contents of the flask were cooled and kept at 5° to 10° C.

On the other hand, 9.98 g of N,N'-bis[4-[2-(4-hydroxyphenyl)-2-propyl]phenyl]isophthalamide, 5.75 g of isophthalic acid dichloride, and 5.57 g of p-[N-[4-[2-(4-hydroxyphenyl)-2-propyl]phenyl]amide]benzoyl chloride were dissolved in 150 ml of cyclohexanone.

The cyclohexanone solution was added all at once with vigorous stirring to the flask containing sodium hydroxide, sodium chloride, and water. Reaction was carried out with vigorous stirring at 5° to 10° C. for about 4 hours. After completion of reaction, the flask was allowed to stand until the organic phase and aqueous phase separated from each other. The organic phase was washed five times with 500 ml of water to remove inorganic salts. The organic phase was poured into about 1 liter of warm water to cause the polymer to separate out, and the separated polymer was vacuum dried at 150° C. for 6 hours.

A white polymer having the following characteristics was obtained in an amount of 16.1 g (yield: 90%).
Reduced viscosity: 0.86
Thermal decomposition temperature: 410° C.
Weight-average molecular weight: 19,000

EXAMPLE 10

Into the same apparatus as used in Example 9 were charged 2.33 g of sodium hydroxide, 24.3 g of sodium chloride, and 91.3 ml of water. The contents of the flask were kept at 5° to 10° C.

On the other hand, 10.0 g of p-[N-[4-[2-(4-hydroxyphenyl)-2-propyl]phenyl]amide]benzoyl chloride, 3.47 g of terephthalic acid dichloride, and 9.98 g of N,N'-bis-[4-[2-(4-hydroxyphenyl)-2-propyl]phenyl]isophthalamide were dissolved in 104 ml of cyclohexanone.

The cyclohexanone solution was added all at once with vigorous stirring to the flask containing sodium hydroxide, sodium chloride, and water. Reaction was carried out with vigorous stirring at 5° to 10° C. for about 4 hours. After completion of reaction, the resulting polymer was treated as in Example 9. A white polymer having the following characteristics was obtained in an amount of 19.2 g (yield: 90.0%).
Reduced viscosity: 0.93
Thermal decomposition temperature: 413° C.
Weight-average molecular weight: 16,500

EXAMPLE 11

Into the same apparatus as used in Example 9 were charged 2.24 g of sodium hydroxide, 25.0 g of sodium chloride, and 95.0 ml of water. The contents of the flask were kept at 5° to 10° C.

On the other hand, 10.23 g of m-[N-[4-[2-(4-hydroxyphenyl)-2-propyl]phenyl]amide]benzoyl chloride, 3.05 g of isophthalic acid dichloride, and 8.77 g of N,N'-bis-[4-[2-(4-hydroxyphenyl)-2-propyl]phenyl]terephthalamide were dissolved in 190 ml of cyclohexanone.

The cyclohexanone solution was added all at once with vigorous stirring to the flask containing sodium hydroxide, sodium chloride, and water. Reaction was carried out with vigorous stirring at 5° to 10° C. for about 4 hours. After completion of reaction, the resulting polymer was treated as in Example 9. A white polymer having the following characteristics was obtained in an amount of 17.63 (yield: 88%).
Reduced viscosity: 0.94
Thermal decomposition temperature: 415° C.
Weight-average molecular weight: 15,000

What is claimed is:

1. A process for producing an aromatic polyester amide polymer which comprises reacting hydroxyphenyl-amino-phenyl-propane represented by the formula I:

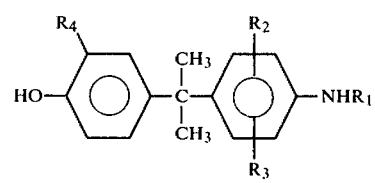

(where $R_1$ denotes a hydrogen atom or an alkyl group of 1 to 3 carbon atoms; $R_2$ and $R_3$ denote a hydrogen atom, an alkyl group of 1 to 3 carbon atoms, a chlorine or a bromine atom; and $R_4$ denotes a hydrogen atom or an alkyl group of 1 to 3 carbon atoms) with an aromatic dicarboxylic acid dihalide represented by the formula II:

(where Ar denotes m- or p-phenylene, naphthalene, diphenylene, diphenylalkylene, diphenylether, or diphenylsulfide group and X denotes a chlorine or a bromine atom) in substantially equimolar amounts at a temperature of 5° to 80° C. in the presence of an inert organic solvent to give the compounds represented by formulas III and IV:

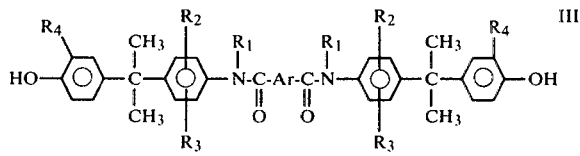

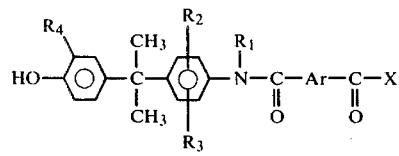

(where $R_1$, $R_2$, $R_3$, $R_4$, Ar, and X are as defined above) and subsequently bringing the organic solvent phase into contact with an aqueous phase containing an acid acceptor at a temperature of −10° to 40° C., whereby completing the polycondensation reaction, wherein the ratio of organic solvent to water in the aqueous phase is approximately 4:1 to 1:1.

2. A process as set forth in claim 1, wherein the acid acceptor is a hydroxide, carbonate, bicarbonate, acetate, or phthalate of alkali metal or alkaline earth metal, or a mixture thereof.

3. A process as set forth in claim 1, wherein the aqueous phase contains a neutral salt of inorganic electrolyte.

4. A process for producing an aromatic polyester amide which comprises bringing an organic phase of an inert organic solvent containing at least one kind of benzoyl halide represented by the formula IV':

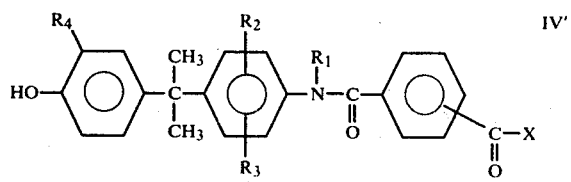

(where $R_1$, $R_2$, $R_3$, $R_4$, and X are as defined in claim 1) into contact with an aqueous phase containing an acid acceptor at a temperature of $-10°$ to $40°$ C., whereby carrying out the polycondensation reaction, wherein the ratio of organic solvent to water in the aqueous phase is approximately 4:1 to 1:1.

5. A process as set forth in claim 4, wherein the acid acceptor is a hydroxide, carbonate, bicarbonate, acetate, or phthalate of alkali metal or alkaline earth metal, or a mixture thereof.

6. A process as set forth in claim 4, wherein the aqueous phase contains a neutral salt of inorganic electrolyte.

7. A process for producing an aromatic polyester amide which comprises bringing an organic phase of an inert organic solvent containing at least one kind of phthalamide derivative represented by the formula III':

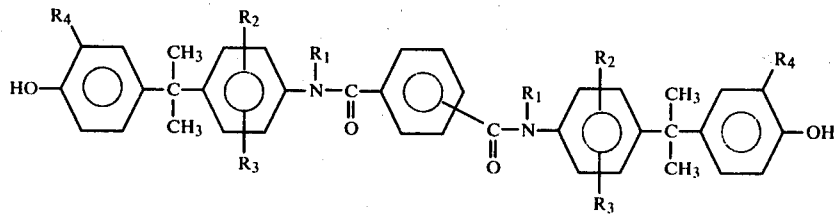

(where $R_1$, $R_2$, $R_3$, $R_4$ are as defined below) and an aromatic dicarboxylic acid dihalide represented by the formula II:

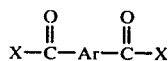

(where X and Ar are as defined below) and, if necessary, at least one kind of aromatic benzoyl halide represented by the formula IV':

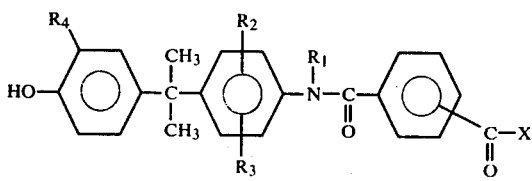

(where $R_1$, $R_2$, $R_3$, $R_4$, and X are as defined in claim 1) into contact with an aqueous phase containing an acid acceptor at a temperature of $-10°$ to $40°$ C., whereby carrying out the polycondensation reaction, wherein the ratio of organic solvent to water in the aqueous phase is approximately 4:1 to 1:1.

8. A process as set forth in claim 7, wherein the acid acceptor is a hydroxide, carbonate, bicarbonate, acetate, or phthalate of alkali metal or alkaline earth metal, or a mixture thereof.

9. A process as set forth in claim 7, wherein the aqueous phase contains a neutral salt of inorganic electrolyte.

10. A process for producing an aromatic polyester amide polymer which comprises reacting hydroxyphenylamino-phenyl-propane represented by the formula I:

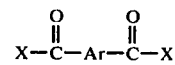

(where $R_1$ denotes a hydrogen atom or an alkyl group of 1 to 3 carbon atoms; $R_2$ and $R_3$ denote a hydrogen atom, an alkyl group of 1 to 3 carbon atoms, a chlorine or a bromine atom; and $R_4$ denotes a hydrogen atom or an alkyl group of 1 to 3 carbon atoms) with an aromatic dicarboxylic acid dihalide represented by the formula II:

$$X-\overset{O}{\underset{\|}{C}}-Ar-\overset{O}{\underset{\|}{C}}-X$$

wherein Ar denotes m- or p-phenylene and X denotes a chlorine or a bromine atom in the molar ratio of formula II compound to formula I compound of 2 or more at a temperature of $-50°$ to $80°$ C. in an inert organic solvent to give benzoyl halide derivatives represented by formula IV':

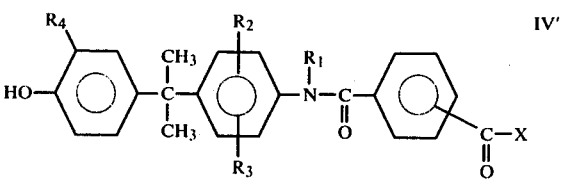

(wherein $R_1$, $R_2$, $R_3$, $R_4$ and X are as defined above) and then bringing an inert organic solvent phase having said benzoyl halide derivative dissolved therein into contact with an aqueous phase containing an acid acceptor at a temperature of $-10°$ to $40°$ C., whereby completing the polycondensation reaction, wherein the ratio of organic solvent to water in the aqueous phase is approximately 4:1 to 1:1.

at a temperature of 5° to 80° C. in an inert organic solvent to form phthalamide derivatives of formula III',

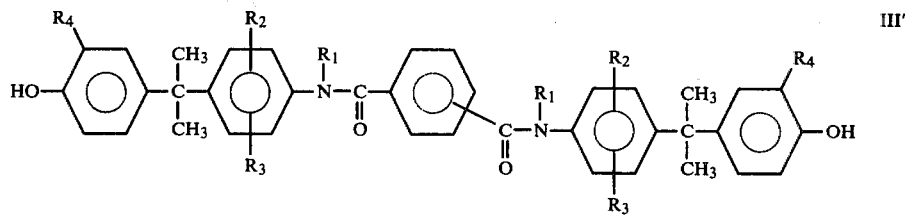

11. A process for producing an aromatic polyester amide polymer which comprises reacting hydroxyphenyl-aminophenyl propane represented by the formula I:

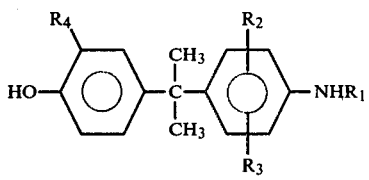

wherein $R_1$ denotes a hydrogen atom or an alkyl group of 1 to 3 carbon atoms; $R_2$ and $R_3$ denote a hydrogen atom, an alkyl group of 1 to 3 carbon atoms, a chlorine or bromine atom; and $R_4$ denotes a hydrogen atom or an alkyl group of 1 to 3 carbon atoms with an aromatic dicarboxylic acid dihalide represented by the formula II:

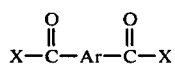

wherein Ar denotes m- or p-phenylene, and X denotes a chlorine or a bromine atom in the molar ratio of formula I compound to formula II compound of about 2:1

(where $R_1$, $R_2$, $R_3$, and $R_4$ are as defined above) and then bringing an organic phase having said phthalamide derivative and an aromatic dicarboxylic acid dihalide of formula II:

$$X-\overset{O}{\underset{\|}{C}}-Ar-\overset{O}{\underset{\|}{C}}-X \qquad II$$

wherein Ar and X are as defined above and if necessary, an aromatic benzoyl halide of formula IV'

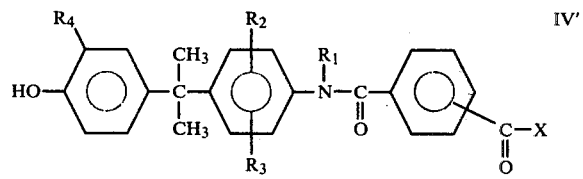

(wherein $R_1$, $R_2$, $R_3$, $R_4$ and X are as defined above) dissolved in an inert organic solvent into contact with an aqueous phase containing an acid acceptor at a temperature of $-10°$ to 40° C. whereby completing a polycondensation reaction wherein the ratio of organic solvent to water in the aqueous phase is approximately 4:1 to 1:1.

* * * * *